US006361747B1

(12) United States Patent
Dion et al.

(10) Patent No.: US 6,361,747 B1
(45) Date of Patent: Mar. 26, 2002

(54) REACTOR WITH ACOUSTIC CAVITATION

(75) Inventors: Jean-Luc Dion; Kodjo Agbossou, both of Trois-Rivières-Ouest (CA)

(73) Assignee: Sonertec Inc., Trois-Rivieres-Quest (CA)

( * ) Notice: Subject to any disclaimer, the term of this patent is extended or adjusted under 35 U.S.C. 154(b) by 0 days.

(21) Appl. No.: 09/701,133

(22) Filed: Nov. 21, 2000

Related U.S. Application Data

(63) Continuation of application No. PCT/CA99/00480, filed on May 25, 1998.

(30) Foreign Application Priority Data

May 26, 1998 (CA) ............................................. 2238951

(51) Int. Cl.[7] .............................................. B06B 1/08
(52) U.S. Cl. ...................... 422/128; 366/127; 366/116; 310/334; 310/323
(58) Field of Search .......................... 422/128; 310/323, 310/334; 366/116, 127

(56) References Cited

U.S. PATENT DOCUMENTS

| 4,016,436 A | 4/1977 | Shoh |
| 4,333,796 A | 6/1982 | Flynn |
| 4,369,100 A | 1/1983 | Sawyer |
| 4,556,467 A | 12/1985 | Kuhn et al. |
| 4,764,021 A | 8/1988 | Eppes |
| 4,934,191 A | 6/1990 | Kroening et al. |
| 5,110,443 A | 5/1992 | Gregoli et al. |
| 5,214,343 A | 5/1993 | Baumoel |
| 5,384,508 A | 1/1995 | Vaxelaire |
| 5,466,570 A | 11/1995 | Jagannathan et al. |
| 5,467,791 A | 11/1995 | Kato et al. |
| 5,484,573 A | 1/1996 | Berger et al. |
| 5,494,585 A | 2/1996 | Cox |
| 5,523,058 A | 6/1996 | Umemura et al. |
| 5,658,534 A | 8/1997 | Desborough et al. |
| 5,659,173 A | 8/1997 | Putterman et al. |
| 5,665,917 A | 9/1997 | Berman |

FOREIGN PATENT DOCUMENTS

WO   98/49671   11/1998

*Primary Examiner*—Robert J. Warden, Sr.
*Assistant Examiner*—Sean E. Conley
(74) *Attorney, Agent, or Firm*—Altera Law Group, LLC (57) ABSTRACT

The invention concerns a reactor with acoustic cavitation comprising a tube (10) made of flexible material, wherein the liquid to be treated circulates. Electro-acoustic transducers (1) are radially and uniformly distributed around the tube (10). Each electro-acoustic transducer (1) has a general prismatic shape with a base of specific width and a head narrower than the base, the head pressed on the tube (10). Each electro-acoustic transducer (1) includes an electro-acoustic motor (78) mounted at the base such that the vibrations generated by the electro-acoustic motor (78) are amplified at the head by the electro-acoustic transducer (1) shape. Lubricating films (9) extend between the electro-acoustic transducers (1) heads and the tube (10), so as to produce an acoustic coupling of the electro-acoustic transducers with the tube. The whole set is in a sealed chamber (83) where the pressure is maintained at a predetermined value and where the lubricating and cooling liquid circulates.

45 Claims, 9 Drawing Sheets

REACTOR WITH ACOUSTIC CAVITATION

This application is a continuation of international application PCT/CA99/00480 filed May 25, 1998.

FIELD OF THE INVENTION

The present invention generally relates to devices and processes used for physicochemical treatment of matters, and more particularly relates to a reactor with acoustic cavitation adapted to use ultrasounds and an acoustic cavitation for the continuous physicochemical treatment of fluid matters, in closed loop or in open loop.

BACKGROUND

Prior techniques for physicochemical treatment of various liquids and liquid mixtures by acoustic cavitation in a frequency range going from about 100 Hz to a few tens of kilohertz are well known. These processes are carried out in acoustic cavitation reactors that are generally of two types: the reactors for tank, with or without external circulation, and continuous external circulation reactors in open loop or closed loop. The frequencies below 20 kHz are generally said to be "acoustic", and those above 20 kHz are said to be "ultrasonic". Hereinafter, "ultrasonic reactor" or "acoustic cavitation reactor" will be equally used, whatsoever the operating frequency. Generally, in these ultrasonic reactors, an intense acoustic field is produced by means of electroacoustic sources coupled to the liquid volume to be processed which is located in a suitable enclosure. These sources are generally of piezoelectric type or of a magnetostrictive type.

When the acoustic intensity produced in the liquid exceeds a certain threshold which depends on the nature of the liquid, of the temperature, of the pressure and of the gases in solution, a spontaneous production of cavitation bubbles happens in a few microseconds. But then, the implosion of these bubbles produces a phenomenon of extreme violence called "acoustic cavitation". Within the cavitation bubbles, the temperature can largely exceed 5000 K, and the implosion produces spherical shock waves whose acoustic pressure can be over 1000 atmospheres. These extreme microscopical conditions are the sources of the physicochemical phenomenons which are produced nearby: division of the particles, cleaning and erosion of the surfaces, rupture of the molecules, formation of free radicals, acceleration of the chemical reactions, etc. The chemical or "sonochemical" applications of the acoustic cavitation have been the subject of many publications, including synthesis works like, for example: "Practical Sonochemistry—User's guide to applications in chemistry and chemical engineering" by T. J. Mason, Ellis Horwood, Chichester, R. U., 1991.

In all the prior reactors, generally, the acoustic intensity is the highest at the surface itself of the sources or transducers, or at the internal surface of the reactor coupled to these sources. The acoustic cavitation activity is the most intense on these surfaces and decreases rapidly with the distance. It is the case, for example, in the reactor of U.S. Pat. No. 4,556,467 (Kuhn et al.), or in the one of U.S. Pat. No. 5,484,573 (Berger et al.). This undesirable effect is particularly present in all the reactors using vibrating rods or pistons or "horns" of small section (a few $cm^2$, of a diameter largely under the wavelength of sound in the liquid), thrusted into the liquid to be processed: in this case, the volume where the interesting acoustic cavitation happens is reduced to only a few cubic centimeters.

According to the well known principles of acoustic diffraction, the conical transducers of the prior art described in U.S. Pat. No. 4,333,796 (Flynn), can thus only produce the cavitation in the neighbourhood of their narrow surface, and not at the center of the reactor as it is alleged. U.S. Pat. No. 4,556,467 (Kuhn et al.) describes a device used for the continuous treatment of liquids with particles in suspension flowing between parallel vibrating plates. However, in this device, the acoustic cavitation occurs with the maximum intensity directly on the internal metallic surfaces of the plates, which is an important drawback as discussed hereinafter. U.S. Pat. No. 5,384,508 (Vaxelaire) describes an acoustic cavitation reactor made up of a metallic tube having a circular section where a liquid can flow, with piezoelectric transducers positioned at uniform intervals along the tube. These transducers induce the longitudinal resonance of the tube whose length is approximately an integer multiple of a quarter of the wavelength of the sound in the material of the tube. It follows that the acoustic pressure varies periodically along the tube and that it is essentially constant in a transversal section. In this way, the intensity of the acoustic cavitation is the highest only in certain zones spaced by a half-wavelength along the tube. Also in this case, the acoustic cavitation occurs on the internal surface of the tube, which is undesirable. U.S. Pat. No. 4,016,436 (Shoh) describes a device highly similar to the former one, with essentially the same drawbacks.

In all of these prior art techniques, the acoustic cavitation has the effect of gradually destroying the surface of the transducers or of the reactors. Furthermore, the particles resulting from this destruction can combine in an undesirable way with the chemical reactants treated by cavitation.

SUMMARY

An object of the present invention is to provide an acoustic cavitation reactor, wherein the major drawbacks of the prior art devices are essentially absent.

A subsidiary object of the present invention is to provide an acoustic cavitation reactor, adapted to perform a continuous treatment of important fluid volumes in circulation at highly variable flow rates compared to the prior art methods and devices.

Another subsidiary object of the present invention is to provide an acoustic cavitation reactor which does not cause a gradual destruction of the walls of the tube in which the liquid to be treated flows.

The acoustic cavitation reactor according to the invention comprises a tube made of flexible material. The tube has an outer wall, an inner wall defining a conduit, and opposite ends respectively provided with inlet and outlet openings communicating with the conduit. Electroacoustic transducers are radially and uniformly distributed around the tube. Each electroacoustic transducer is in a prismatic bar shape having a base of a specific width and a head narrower than the base, which head is pressed on the tube. Each electroacoustic transducer includes an electroacoustic motor mounted at the base such that vibrations generated by the electroacoustic motor are amplified at the head by the shape of the electroacoustic transducer. Films of lubricant extend between the heads of the electroacoustic transducers and the tube, in order to produce an acoustic coupling of the electroacoustic transducers with the tube.

In a first mode of operation, the acoustic cavitation reactor according to the invention allows to produce a cylindrical zone of intense acoustic cavitation in the liquid flowing in the tube, centered on the principal axis of the tube, and whose radius can be smaller than the internal radius of the tube, the radius of this cavitation zone increasing with the intensity of the energization current of the electroacoustic transducers.

In a second mode of operation, the acoustic cavitation reactor according to the invention allows to produce a cylindrical zone of intense turbulence and stirring in the liquid flowing in the tube, centered around the principal axis of the tube, the stirring intensity increasing with the intensity of the energization current of the electroacoustic transducers, with relatively little acoustic cavitation.

Preferably, the tube, the electroacoustic transducers and the films of lubricant are disposed in an enclosure that can be sealed, in which the pressure can be maintained at a determined value with respect to the one in the tube.

Preferably, each electroacoustic transducer comprises a solid bar of uniform prismatic section used for the amplification of the vibrations, and whose longitudinal face at the head is pressed on the tube. The amplifying bar can exhibit a distribution of transverse slots or holes extending in a radial plane with respect to the tube.

Preferably, the head of each electroacoustic transducer exhibits a concave surface substantially fitting the outer wall of the tube, as well as a widening facing the tube.

Preferably, the electroacoustic motor of each electroacoustic transducer comprises a piezoelectric or magnetostrictive resonator secured to the amplifying bar at the base of the electroacoustic transducer. Preferably, the electroacoustic transducers are secured to sides of a polygonal structure formed of two rings positioned at the ends of the tube and extending respectively over and under the electroacoustic transducers.

The enclosure can be surrounded by a peripheral radiator and/or a heat exchanger communicating with a set of conduits and nozzles for lubricant distribution in the enclosure.

BRIEF DESCRIPTION OF THE DRAWINGS

A detailed description of the preferred embodiments of the invention will be given hereinafter in reference with the following drawings, in which the same numerals refer to identical or similar elements.

DETAILED DESCRIPTION OF THE PREFERRED EMBODIMENTS

Figure 1:
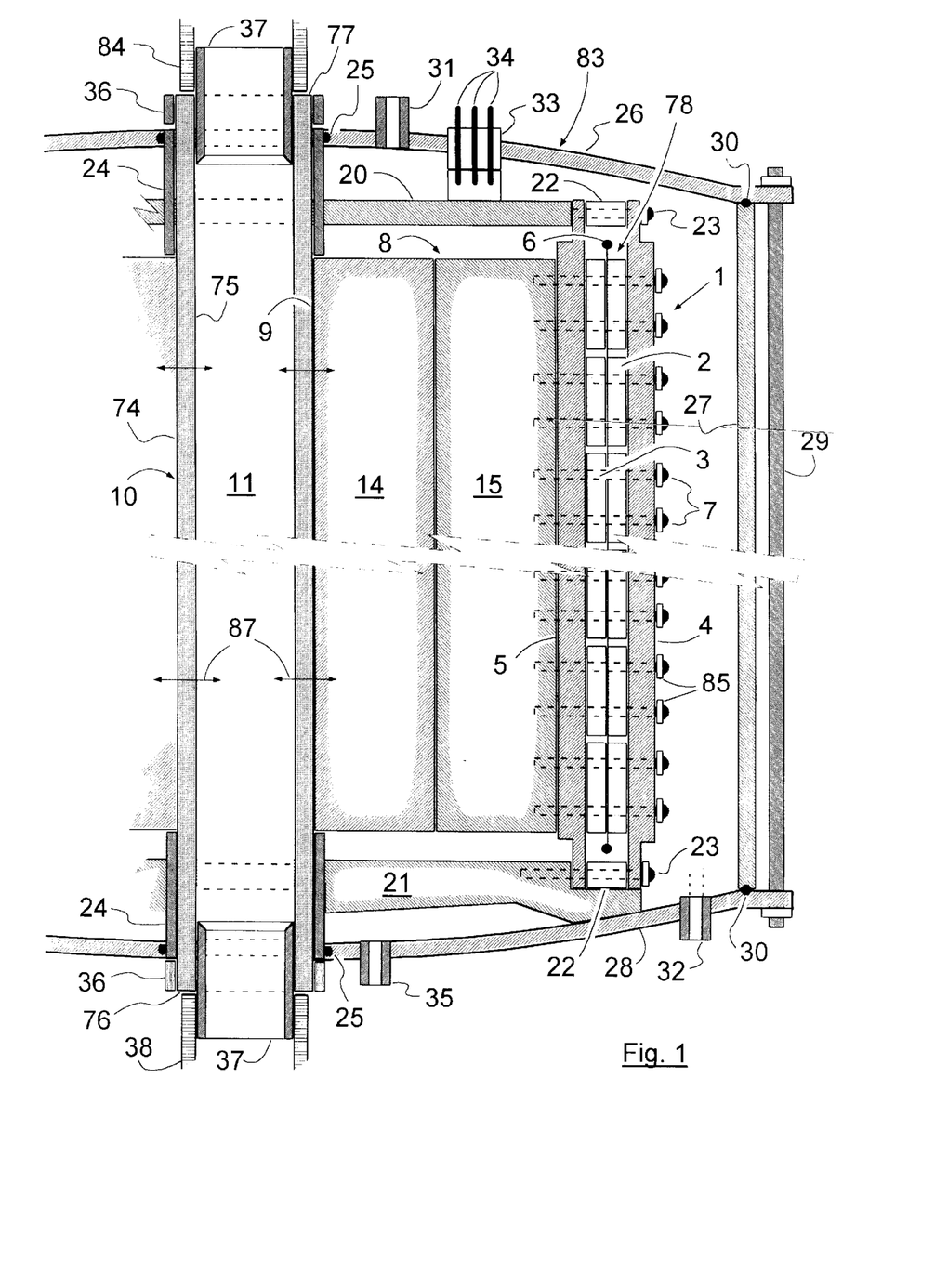
FIG. 1 is a partial longitudinal cross-section view of a reactor according to the invention.

Referring to FIG. 1, there is shown an acoustic cavitation reactor, according to the invention. The reactor comprises an elongated tube 10 made of flexible material. The tube 10 has an outer wall 74, an inner wall 75 defining a conduit intended to receive a liquid to be treated in circulation, and opposite ends provided respectively with inlet and outlet openings 76, 77 communicating with the conduit.

Figure 2:
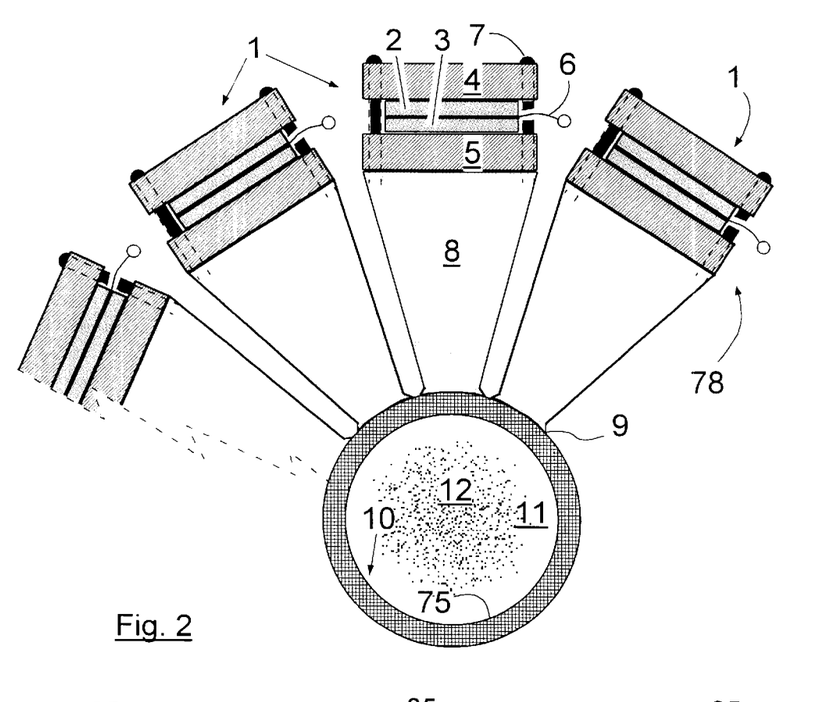
FIG. 2 is a partial transversal cross-section view of a reactor according to the invention, showing the arrangement of the electroacoustic transducers around the tube.

Referring also to FIG. 2, the reactor comprises electroacoustic transducers 1 radially and uniformly distributed around the tube 10. Each electroacoustic transducer 1 is in a uniform or symmetrical prismatic shape having a base of specific width and a head narrower than the base, the head being pressed on the tube 10. Each electroacoustic transducer 1 includes an electroacoustic motor 78 mounted at the base such that vibrations produced by the electroacoustic motor 78 are amplified at the head by the shape of the electroacoustic transducer 1. In one of the modes of operation of the invention, the in-phase vibration of the transducers 1 produces in the liquid flowing in the tube 10, converging cylindrical acoustic waves that can induce acoustic cavitation in a cylindrical zone concentric to the tube 10, which cavitation can be maintained away from the inner wall 75 of the tube 10 as a function of the energizing current of the electroacoustic transducers 1. In another mode of operation of the invention, the vibration of the transducers 1 with a phase which varies in a specific way from one transducer 1 to the other or from a group of transducers 1 to the other, produces in the liquid flowing in the tube 10, acoustic waves that superimpose with one another to create a cylindrical zone where the acoustic displacement in all points is essentially elliptical, which results in producing a turbulence or a stirring of the liquid.

The reactor comprises films of lubricant 9 between the heads of the electroacoustic transducers 1 and the tube 10, to produce an acoustic coupling of the electroacoustic transducers 1 with the tube 10.

Each electroacoustic transducer 1 comprises a solid amplifying bar 8 also of uniform prismatic shape. The shape of the bar 8 is such that an amplification of the acoustic velocity of the vibrations going from the electroacoustic motor 78 towards the tube 10 occurs and hence, a better adaptation of the acoustic impedance of the transducer 1 to the one presented by the surface 74 of the tube 10.

Figure 3:
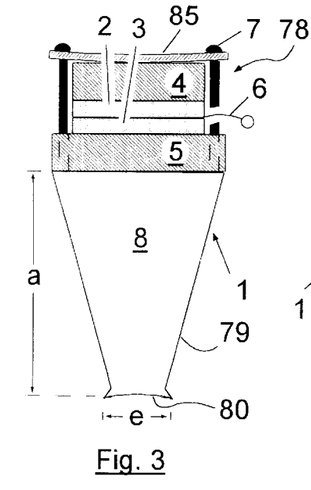
FIGS. 3, 4 and 5 are top views respectively showing embodiments of an electroacoustic transducer with a piezoelectric resonator, according to the invention.

Referring to FIG. 3, the amplifying bar 8 may have rectilinear lateral walls 79 between the base and the head, forming a narrowing toward the tube 10. The amplifying bar 8 can then be made of a homogeneous solid.

Figure 4:
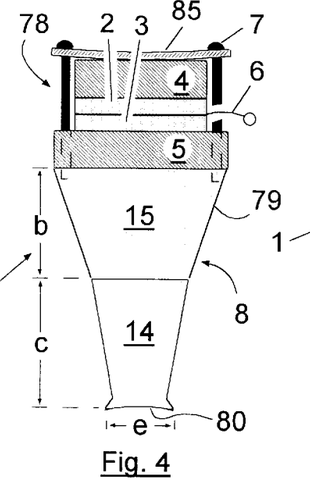

Referring to FIG. 4, the amplifying bar 8 can have lateral walls 79 between the base and the head forming successively less pronounced narrowings toward the tube 10. In this variant, the amplifying bar 8 can feature front and rear longitudinal sections 14, 15 made of different materials to achieve a better acoustic coupling between the electroacoustic transducers 1 and the tube 10 with the liquid 11. Typically but not restrictively, the material of the rear section 15 will have an acoustic impedance higher to the one of the material of the front section 14, comprised between the one of the front section 14 and the one of the elements of the electroacoustic motor 78.

Figure 5:
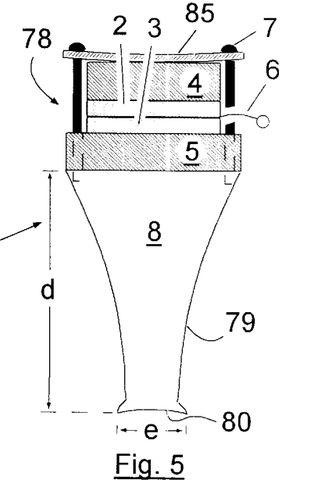

Referring to FIG. 5, the amplifying bar 8 can have concave lateral walls 79 between the base and the head, forming a narrowing toward the tube 10. The lateral walls 79 can adopt an essentially exponential profile, as illustrated. This embodiment of the amplifying bar 8 can generally produce a superior coupling with the tube 10 and the liquid 11.

Referring to FIGS. 2 to 5, the head of each electroacoustic transducer 8 preferably presents a concave surface 80 substantially fitting the outer wall 74 of the tube 10. The concave surface 80 has in the illustrated case a curvature equal to the one of the tube 10 so that it firmly presses thereupon. Preferably, the head of each electroacoustic transducer 1 features a widening facing the tube 10.

Referring also to FIGS. 8A, 8B, 10 and 14, each electroacoustic transducer 1 may have a number of incurved retaining plates or tabs or springs 85 secured to the amplifying bar 8 and pressing upon the center of the electroacoustic motor 78. The retaining plates or springs 85 can be in steel and secured to the amplifying bar 8 by fastening elements 7 such as bolts or screws, for ensuring the robustness and the acoustic coupling of the set. The use of such retaining plates or springs 85 is particularly suitable when the bars 4, 5, the motor elements 2, 3, 6 and the amplifying bar 8 are fixedly secured by means of layers of glue between them, or yet are spaced from one another by layers of grease substances between them. Furthermore, an advantage resulting from the use of such retaining plates or springs 85 is to reduce the rear mass of the electroacoustic motor 78 since the dimension of the bar 4 is then reduced (in comparison with the embodiment illustrated in FIG. 2), and also to increase the resonant frequency of the electroacoustic transducers 1 if such is desirable.

Figures 7A, 7B:
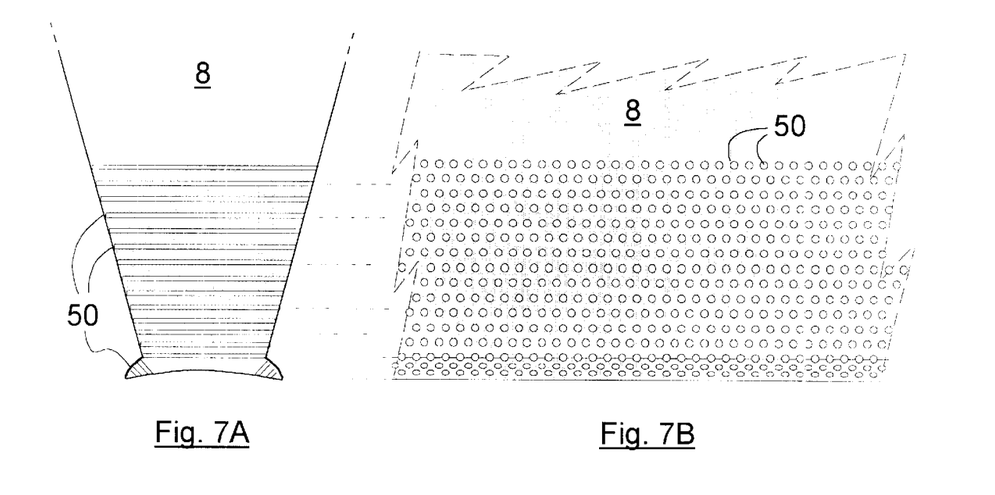
FIGS. 7A and 7B are respectively a transversal cross-section view and a partial longitudinal view of an electroacoustic transducer according to the invention, showing the distribution of holes in the head of the electroacoustic transducer.

Referring to FIGS. 7A and 7B, the front or narrow portion of the amplifying bar 8, including the head and which is in contact with the tube 10, may have a distribution of transverse holes 50 extending in radial planes with respect to the tube 10 for the purpose of reducing the effective acoustic impedance of this portion. This allows to achieve a better acoustic coupling of the transducer 1 with the tube 10.

Figure 10:
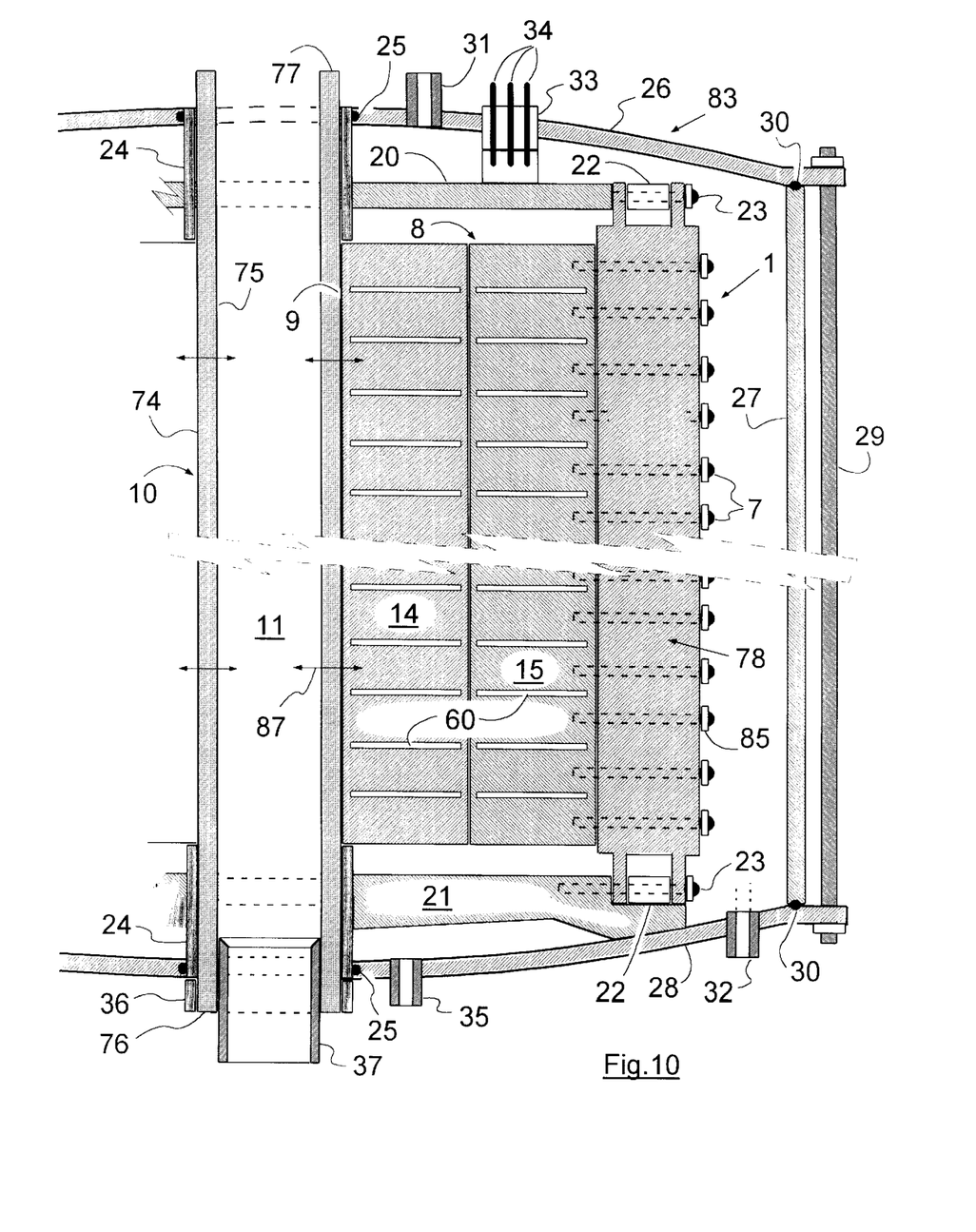
FIG. 10 is a partial longitudinal cross-section view of a reactor according to the invention, showing the amplifying bar of an electroacoustic transducer with slots.

Referring to FIG. 10, the amplifying bar 8 may have a distribution of transverse slots 60 extending in radial planes with respect to the tube 10. The slots 60 are preferably thin and substantially equidistant from one another across the amplifying bar 8. A function of these slots 60 is to suppress, by decoupling of modes, certain undesirable higher vibration modes, or flexion modes in a plane of symmetry of the module as for example the plane illustrated in the figure.

Figure 14:
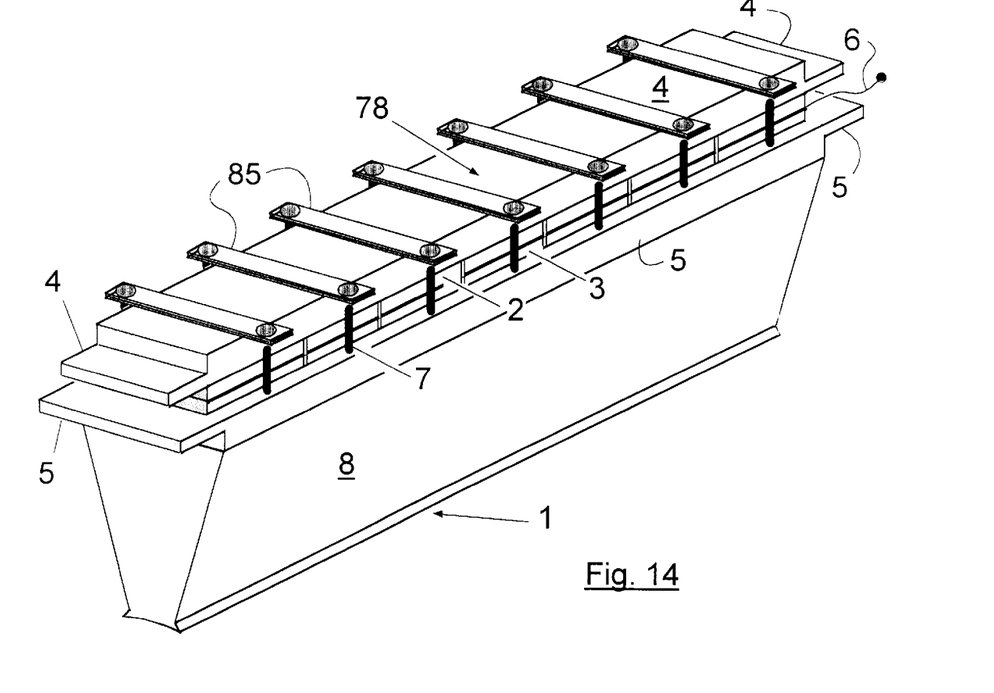
FIG. 14 is a perspective view of an electroacoustic transducer with a piezoelectric resonator according to the invention.

Referring to FIGS. 1 and 14, the electroacoustic motor 78 of each electroacoustic transducer 1 may take the form of a piezoelectric resonator, for example of Langevin type, secured to the amplifying bar 8 at the base of the electroacoustic transducer 1. The piezoelectric resonator comprises two rows of piezoelectric elements 2, 3 between which a central electrode 6 extends. The number of these piezoelectric elements can be any. The two rows 2, 3 and the central electrode 6 are inserted between two lateral electrodes 4, 5 electrically interconnected together (not illustrated). The central electrode 6 can be formed of a metallic sheet, and the lateral electrodes 4, 5 can be formed of metallic bars joined fixedly by screws or bolts 7 on the amplifying bar 8 whose head is firmly pressed on the tube 10 through a film 9 of lubricant such as oil, a hydrocarbon or any other lubricant substance. Typically, the piezoelectric elements 2, 3 are ferroelectric ceramics, and the bars 4, 5 are in steel. The amplifying bar 8 is typically made of a material having an acoustic impedance lower to the one of the bars 4, 5 and the piezoelectric elements 2, 3. In the case where the amplifying bar 8 is made of two, front and rear longitudinal sections 14, 15 as illustrated in FIG. 4 (the front section 14 including the head of the transducer and the rear section being secured to the base of the transducer), and that the sections 14, 15 are made of different materials, then the front section 14 will preferably have a lower acoustic impedance than the rear section 15.

Figures 8A, 8B:
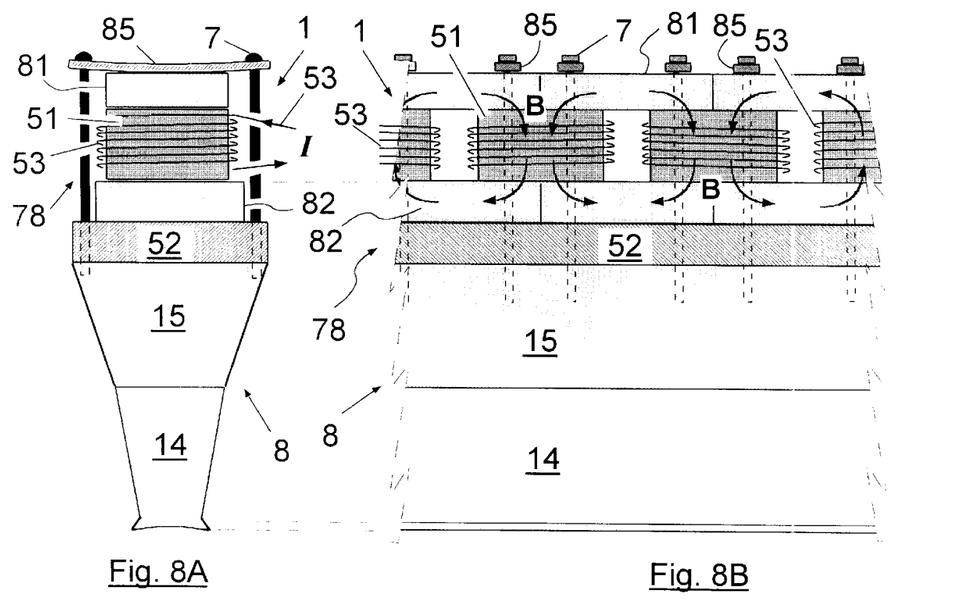
FIGS. 8A and 8B are transversal and partial longitudinal views of an electroacoustic transducer with a magnetostrictive resonator, according to the invention.

Referring to FIGS. 8A and 8B, the electroacoustic motor 78 of each electroacoustic transducer 1 can take the form of a magnetostrictive motor secured to the amplifying bar 8 at the base of the electroacoustic transducer 1. The magnetostrictive motor comprises a magnetic circuit including magnetostrictive elements 51 around which an energization coil 53 is positioned. In operation, a magnetic flux of density B flowing in the magnetic circuit is produced by the energization coil 53 (formed by windings of a conductive wire) carrying an alternating current I. The magnetostrictive elements 51 are preferably magnetostrictive ceramics, and the magnetic circuit comprises for example bars 81, 82 of ferromagnetic ceramics having a high magnetic permeability, between which the magnetostrictive ceramics are inserted. The bars 81, 82 can also be for example in magnetostrictive ceramic. Alternatively, the magnetic circuit can be formed of a longitudinal stack of blades (not illustrated) made for example of a ferromagnetic and magnetostrictive steel alloy positioned such that the magnetic flux circulates parallel to the blades. In operation, the frequency of the alternating current applied to the energization coil 53 will preferably be equal to half of the one of the preferred vibration mode of the electroacoustic transducer 1.

Referring to FIGS. 1, 6, 9, 10 and 11, the reactor comprises a supporting polygonal structure made of two rings 20, 21 extending respectively above and below the electroacoustic transducers 1, and having sides to which the bases of the electroacoustic transducers 1 are secured, for example, by bolts 23, so that the electroacoustic transducers 1 exhibit a concentric configuration around the tube 10. The rings 20, 21 are centered around the tube 10 by braces 24 secured around the tube 10. The bars 4, 5 have ends between which spacers 22 are inserted. The ends of the bars 4, 5 are thinned down compared to the general thickness of the bars 4, 5 and respectively secured to the sides of the rings 20, 21. An advantage of this thinning down of the ends of the bars 4, 5 is the reduction of the acoustic energy losses toward the rings 20, 21, since the bars 4, 5 are sites of an acoustic vibration relatively weaker than at the other points of the transducers 1. Another advantage of this arrangement is that it allows an easy removal and reinstallation of the transducers 1 which can then be easily disassembled for replacement of their components if need be. Although this arrangement is advantageous, it is worth mentioning that any other suitable arrangement can also be used.

The number of electroacoustic transducers 1 is typically comprised between 4 and 16, but it can also be lower or higher according to the needs.

Referring to FIGS. 1 and 10, the reactor preferably comprises an enclosure 83 delimiting an inner space from an outer space, and wherein the tube 10, the acoustic transducers 1 and the films of lubricant 9 are disposed, the ends of the tube 10 communicating with the outer space, so that they can be coupled to inlet and outlet lines 38, 84 conveying the fluid to be treated by the reactor. The lines 38, 84 are, in practice, connected to an outer circulation circuit (not illustrated). The tube 10 preferably extends in a central axis of the enclosure 83, although it can be oriented and positioned differently if need be.

Preferably, the enclosure 83 is sealed and partially filled with a liquid from which the films of lubricant 9 are formed of, the liquid being adapted to cool the electroacoustic transducers 1 and the tube 10 down when the reactor is in operation. The enclosure 83 may have inlet and outlet openings or couplings 32, 35 for the liquid between the outer space and the inner space. The opening 32 is used as an inlet for the lubricant, hydrocarbon or other liquid, used to produce the acoustic coupling films 9, as well as for cooling the electroacoustic transducers 1 down. The opening 35 is used as an outlet for the liquid that flows in closed circuit between the outer heat exchanger (not illustrated) and the inlet opening 32. The enclosure 83 can also have an opening or coupling 31 between the outer space and the inner space, connectable to another device (not illustrated) for adjustment and holding-up of a pressure in the enclosure 83, pressure which can be lower or higher than the atmospheric pressure. Thus, the difference of pressure between the liquid 11 flowing in the tube 10 and the fluid in the enclosure 83 can be controlled. The holding-up of a positive pressure in the tube 10 with respect to the one in the enclosure 83 contributes to maintain the contact between the tube 10 and the transducers 1, thereby avoiding a collapse of the tube 10 and ensuring a maximal acoustic coupling.

The enclosure 83 preferably comprises a sealed connector block 33 between the outer space and the inner space, having conductors 34 electrically connected to the electroacoustic motors 1 (connections not illustrated), thereby supplying them with alternating electric current in order to make them vibrate.

The enclosure 83 can be formed of a cylindrical lateral wall 27 and upper and lower covers 26, 28 secured to the lateral wall 27 over and under it. The covers 26, 28 have centers comprising coaxial braces 24 receiving respectively the ends of the tube 10. The walls 26, 27, 28 can be metallic, and assembled together by mounting bars 29 positioned around the enclosure 83. The sealing of the enclosure 83 is ensured on the one hand by gaskets 30 inserted between the covers 26, 28 and the lateral wall 27 and, on the other hand, by gaskets 25 between the clamps 24 and the covers 26, 28.

Figure 6:
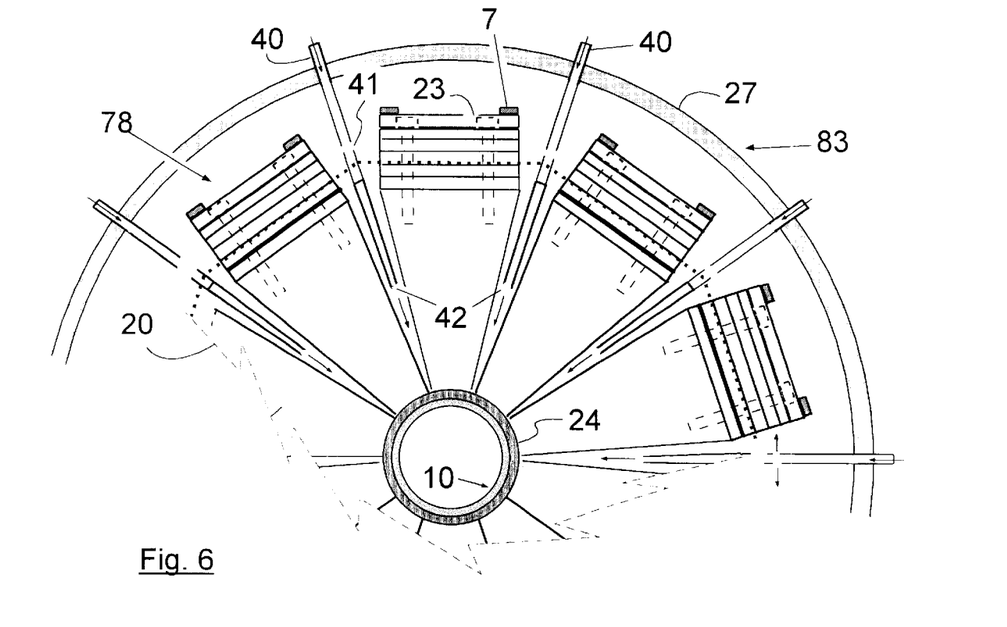
FIG. 6 is a partial transversal cross-section view of a reactor according to the invention, showing the cooling system and the polygonal structure supporting the electroacoustic transducers in the enclosure.
Figure 9:
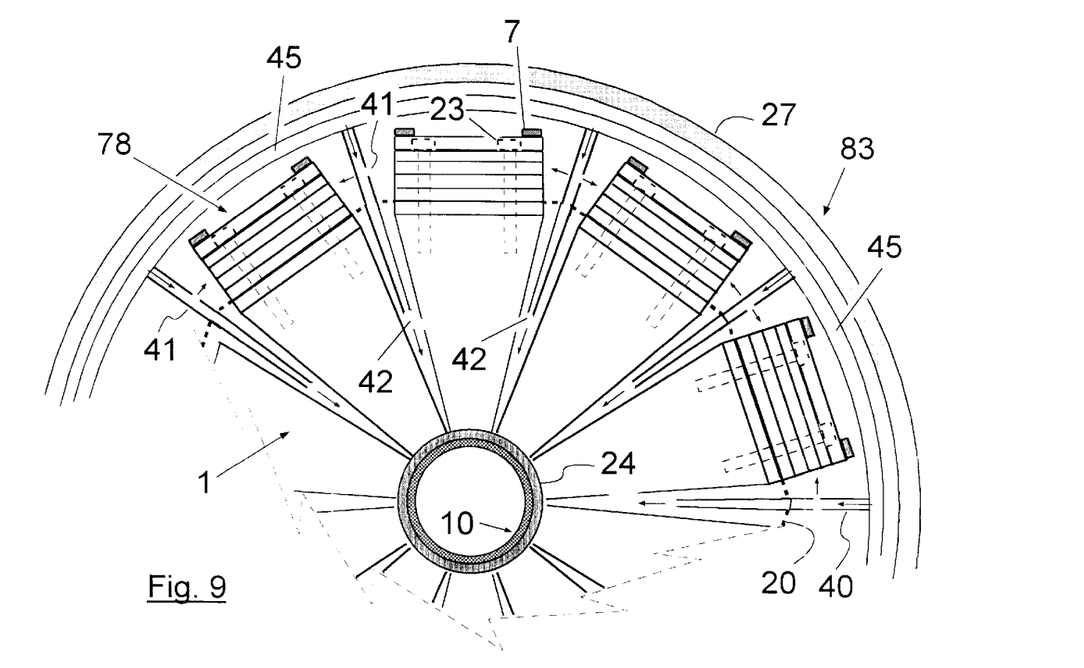
FIG. 9 is a cross-section view of a reactor according to the invention, showing a heat exchanger and lubricant circulation system surrounding the enclosure.

Referring to FIG. 9, the enclosure 83 is provided with a set of peripheral distribution conduits 45 in the inner space connected to the inlet opening 32 (see FIG. 1) for receiving the cooling and coupling liquid, and nozzles 41 connected to the conduits 45 and projecting between the electroacoustic transducers 1 toward the tube 10. The nozzles 40 have outlet openings 41, 42 for the liquid which is thereby projected upon the electroacoustic transducers 1 and particularly toward the tube 10 between the transducers 1. Alternatively, the peripheral conduits 45 can be positioned outside the enclosure 83, the nozzles 40 then running across the lateral wall 27 of the enclosure 83 as illustrated in FIG. 6.

Figure 11:
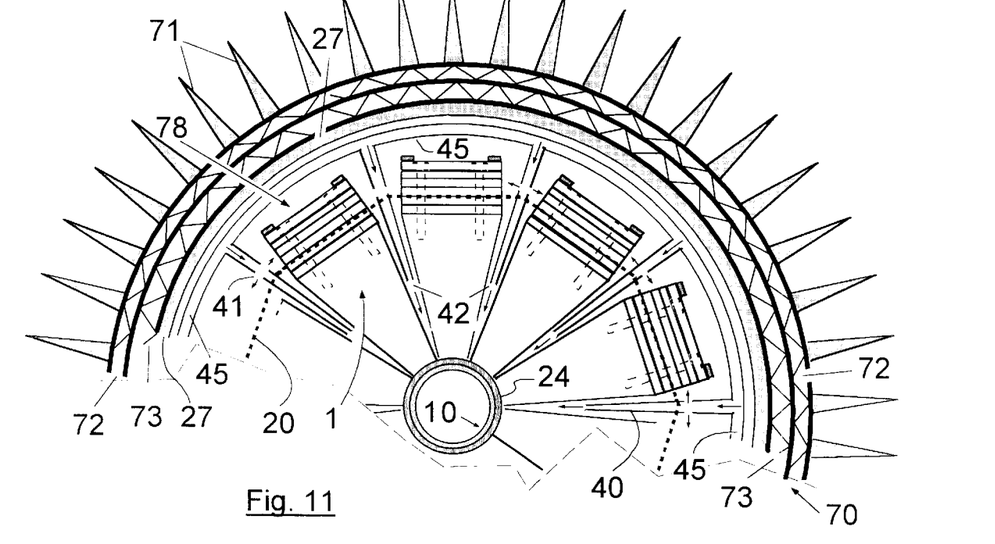
FIG. 11 is a partial transversal cross-section view of a reactor according to the invention, showing the heat exchanger and radiator system.

Referring to FIG. 11, the enclosure 83 can be surrounded by a peripheral heat exchanger/radiator 70 giving over the outer space. The heat exchanger may comprise an inner compartment 73 adjacent to the enclosure 83, wherein a liquid cooled down externally from the reactor may circulate, and an outer compartment 72 adjacent to the inner compartment 73, wherein the cooling and coupling liquid used in the enclosure 83 can circulate, the circulation being forced by a conventional external device (not illustrated). The outer compartment 72 is then connected to the peripheral distribution conduits 45 (connection not illustrated), or yet can be directly connected to the nozzles 40, the compartment 72 then being used in a certain way as a peripheral distribution conduit. The radiator may be provided with fins 71 distributed around the enclosure 83 and projecting in the outer space, thereby improving the efficiency of the radiator for the transfer of inner thermal energy towards ambient air.

Referring to FIG. 1, the tube 10 of flexible material is tightly held, in a sealed way, between the braces 24, the heads (narrow faces) of the electroacoustic transducers 1 and the rings 37 used to connect the tube 10 to the conduits 38, 84. Fastening rings 36 allow to fasten the tube 10 onto the rings 37. The tube 10 is preferably made of a non-resonant material, for example a resistant polymeric material such as various types of fluorocarbon (TFE, PTFE, etc.), with or without reinforcement or die of fibreglass, graphite fibers or mica.

Referring to FIGS. 1 to 5, in operation, an alternating electric voltage having a typical frequency comprised between 10 and 500 kHz is applied between the central electrode 6 and the metallic bars 4, 5, so that the piezoelectric motor elements 2, 3 undergo alternate expansions and contractions at one of the resonant frequencies of the electroacoustic transducers 1 in the direction illustrated by the arrows 87. The frequency of the current is chosen so that the electroacoustic transducers 1 vibrate in one of their higher vibration modes where the expansion of their head (narrow portion) pressed on the central tube 10 is maximal and much higher than the one of their base (rear and opposite portion). The dimensions of the electroacoustic transducers 1 are chosen so that the resonant frequency of each transducer 1 in the direction 87 does not coincide with the one of a higher mode of longitudinal resonance of the transducer 1 (in the direction of its principal axis).

The radial vibrations with respect to the tube 10 are amplified from the motor elements 2, 3, 4, 5 or 51, 81, 82 toward the tube 10. This feature of the transducers 1 will be described hereinafter with more details, in reference with FIGS. 12 and 13. The radial acoustic displacement at the surface 75 of the tube 10 can then be much higher to the one of the motor elements 2, 3, and the passive elements 4, 5 or 51, 81, 82, and produce cylindrical acoustic waves of great intensity converging toward the center of the tube 10 in the fluid 11 flowing in one direction or in the other. During the progression of the waves in the liquid 11, toward the center of the tube 10, the cavitation threshold is reached on a cylindrical surface more or less remote from the inner wall 75 of the tube 10. FIG. 2 shows the cavitation area 12 away from the wall 75 in which the physicochemical reactions of practical interest occur. The creation of a very intense cavitation area having a cylindrical form and a volume relatively important, away from the wall 75 of the tube 10, is one of the features that allow to avoid gradual degradation of the tube 10. To be so, the operating frequency must be such that the wavelength of the sound in the liquid 11 flowing in the tube 10 be equal or lower to the inner diameter of the central tube 10, this frequency being the preferred vibration mode one.

Referring to FIG. 6, the transducers 1 are secured by the bolts 23 onto the polygonal ring 20, centered around the tube 10 by the brace 24. In this embodiment, the nozzles 40 convey from the outside the cooling and coupling liquid which is projected on the transducers 1 through the openings 41, 42. This liquid is preferably a light oil.

Figure 12:
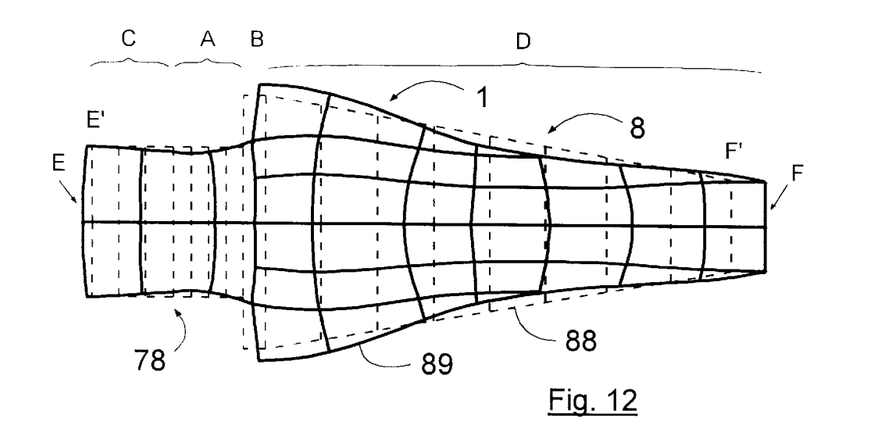
FIG. 12 is a schematic diagram showing a typical and exaggerated deformation of an electroacoustic transducer in its transversal plane at two phases of its deformation.

Referring to FIG. 12, there is shown in a relative way, from a computer simulation, the aspect of the deformation of a transducer 1 of piezoelectric type as the one illustrated in FIG. 3, when it vibrates in the preferred vibration mode. The shape at rest is depicted in dashed lines 88. The shape at the maximum of expansion is depicted in full lines 89. The position at rest of the base (rear portion) of the transducer 1 is designated by E', whereas its position at the maximum of expansion is designated by E. The position at rest of the head (front portion) of the transducer 1, the one which is pressed on the central tube 10, is designated by F', whereas its position at the maximum of expansion is designated by F. In an other possible embodiment, depending on the dimensions of the transducer 1, the maximal expansion of the base or of the head may then be opposite with respect to the one represented in FIG. 12; for example, the position E may stand on the right of the position E'. In every cases, we will look for a vibration mode having a like symmetry, which is achieved for a given frequency by determining a set of proportions between the various dimensions of the elements of the transducer 1, substantially similar to those represented in the figures.

Figure 13:
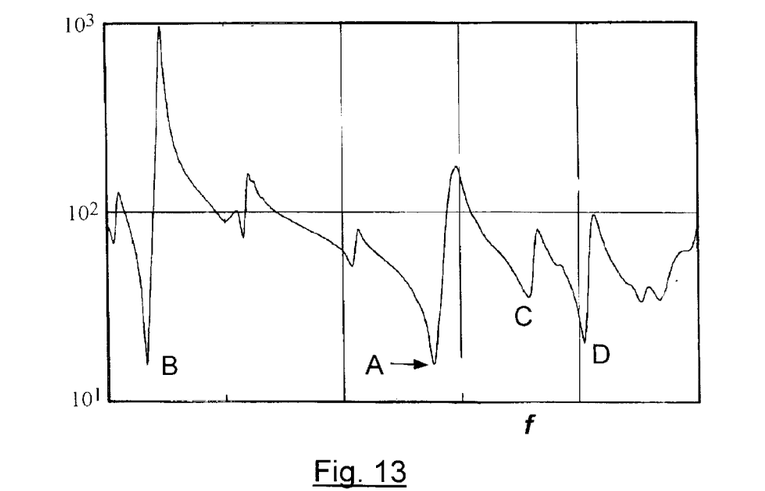
FIG. 13 is a graph representing an electrical impedance spectrum of an electroacoustic transducer according to the invention.

Referring to FIG. 13, there is shown a typical form of the variation of the electrical impedance modulus Z of a piezoelectric type transducer (on a logarithmic scale) as a function of the frequency F. The spectrum is characterized by many impedance minimums such as A, B, C, D . . . which correspond to mechanical resonances of the transducer. Only certain of these resonances correspond to vibration modes in the radial plane (FIGS. 1, 2) that may be used in the preferred embodiments of the invention. Generally, the operation in a higher mode such as A, corresponding to a deformation like the one described in FIG. 12, will be preferred. It is generally necessary that such a mode A be the farthest as possible in frequency from the adjacent modes like the one designated by C or the other lower frequencies.

FIG. 14 shows in a perspective view a preferred embodiment of the electroacoustic transducer 1 comprising piezoelectric elements 2, 3, between the metallic bars 4, 5 used as electrodes, heavily pushed on the piezoelectric elements 2, 3 by means of incurved elastic plates in steel 85 held back by the fasteners 7. The set of elements 2, 3, 4, 5 forming the electroacoustic motor 78 is secured to the amplifying bar 8. This figure clearly shows the narrower ends of the bars 4, 5 which are secured to the polygonal rings 20, 21 (FIG. 1). These bars 4, 5 are thinned down at the ends to reduce their rigidity at the ends such that the acoustic energy transmitted to the polygonal rings 20, 21 is reduced. The elements 2, 3, 4, 5 can of course be replaced by the magnetostrictive magnetic circuits 51, 53, 81, 82 as illustrated in FIG. 8.

Referring to FIG. 1, in summary, in operation, the transducers 1 are excited by in-phase electric currents, so that the acoustic displacements produced at the surface 75 of the tube 10 are essentially in phase, thereby producing a very uniform radial vibration of the wall of the tube 10. Cylindrical acoustic waves converging toward the center of the tube 10 in the fluid 11 in circulation are thereby produced. The intensity of the waves in the fluid 11 increases rapidly in going toward the center of the tube 10 and reaches the cavitation threshold for the fluid 11 at a certain position between the wall 75 and the center of the tube 10. It leads to an intense cavitation area of substantially cylindrical shape, concentric to the tube 10, and spaced from the wall 75. The volume of the cavitation area can largely exceed half of the total inner volume of the tube 10, which allow to process important volumes of fluid in circulation at very variable flowing rates.

Figure 15:
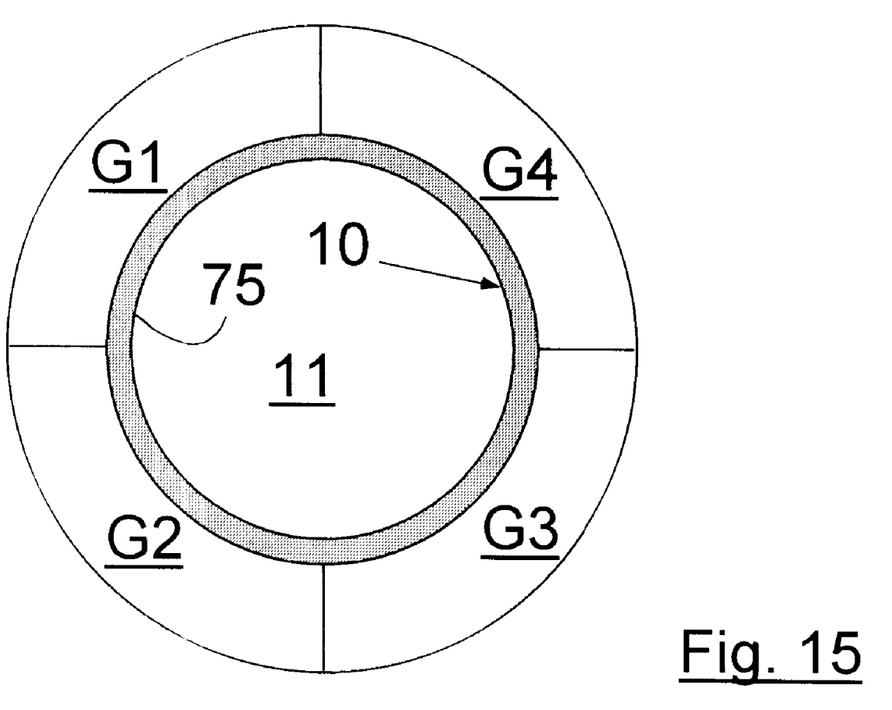
FIG. 15 is a schematic diagram showing a manner of energizing the electroacoustic transducers of the reactor according to the invention.

Referring to FIG. 15, there is shown a special operation mode of the reactor according to the invention, where the excitation of the electroacoustic modules 1 is achieved by alternating currents whose phase varies in a sequential manner in different arbitrary groups in number N of transducers such as G1, G2, G3, G4 around the central tube 10, each group having a same number M of electroacoustic transducers 1. The number N of these groups is not limited to four; it can be two, three, five, etc. Thus, the phase of the acoustic vibrations at the surface 75 of the tube 10 will vary substantially in the same way from one group to the other. The acoustic waves coming from each group then add up with one another in the liquid 11 by producing generally elliptical acoustic vibrations whose complex distribution promotes the powerful stirring of the liquid 11, with relatively little acoustic cavitation. Typically, the phase of the energizing current of a group to the other will vary progressively by a quantity 360/N degrees, without excluding other possibilities of variation. In this way, a great stirring can be particularly produced in a mixture of non-miscible liquids, which allows their efficient emulsification.

Although embodiments of the invention have been illustrated in the appended drawings and described hereinabove, it will become apparent for persons skilled in the art that changes and modifications can be made to these embodiments without departing from the spirit of the invention. For example, the enclosure 83 can be entirely or partially filled with a liquid. Several stages of transducers 1 can be positioned along the length of the tube 10. The rings 20, 21 can take other shapes or their function can be fulfilled by means of an other structure. The tube 10 may have a cylindrical form or have the form of a regular polygon or any other suitable form. It is the same for many other aspects of the reactor hereinabove described. All such modifications or variants are considered to be within the scope of the invention as defined by the appended claims.

What is claimed is:

1. An acoustic cavitation reactor, comprising:

a tube made of flexible material, the tube having an outer wall, and inner wall defining a conduit, and opposite ends provided respectively with inlet and outlet openings communicating with the conduit;

electroacoustic transducers radially and uniformly distributed around the tube and extending over a length of the tube in parallel with a longitudinal central axis of the tube, each electroacoustic transducer being in a prismatic bar shape having a base of specific width and a head narrower than the base, each electroacoustic transducer including an electroacoustic motor mounted at the base such that vibrations generated by the electroacoustic motor are amplified at the head by the shape of the electroacoustic transducer; and films of lubricant between the heads of the electroacoustic transducers and the tube, to produce an acoustic coupling of the electroacoustic transducers with the tube.

2. The reactor according to claim 1, wherein the tube has a longitudinal central axis, the prismatic bar shape is symmetrical with a plane of symmetry crossing the longitudinal central axis of the tube, and each electroacoustic transducer extends parallel to the longitudinal central axis of the tube.

3. The reactor according to claim 2, wherein each electroacoustic transducer comprises a vibration amplifying bar having a shape of a prism of symmetrical section, a longitudinal axis parallel to the longitudinal central axis of the tube, a plane of symmetry which coincides with a plane of symmetry of the electroacoustic transducer, a narrow and elongated portion forming the head of the electroacoustic transducer, and an opposite and larger portion adjoined to the electroacoustic motor.

4. The reactor according to claim 3, wherein the amplifying bar of each electroacoustic transducer is a solid having the shape of the prism of symmetrical section, the solid having flat longitudinal lateral faces between the base and the head, converging toward the head, and mutually and substantially parallel front and rear lateral faces between the base and the head, the front and rear lateral faces being substantially perpendicular to a bisecting plane of the longitudinal lateral faces.

5. The reactor according to claim 3, wherein the amplifying bar of each electroacoustic transducer has concave longitudinal lateral faces between the base and the head, forming a narrowing toward the tube, and mutually and substantially parallel front and rear lateral faces between the base and the head, the front and rear lateral faces being substantially perpendicular to a plane of symmetry of the concave faces.

6. The reactor according to claim 3, wherein the amplifying bar of each electroacoustic transducer has longitudinal lateral faces between the base and the head, forming narrowings successively less pronounced toward the tube, and mutually and substantially parallel front and rear lateral faces between the base and the head, the front and rear lateral faces being substantially perpendicular to a plane of symmetry of the concave faces.

7. The reactor according to claim 1, wherein each electroacoustic transducer has higher mode resonant frequencies of longitudinal resonance, and resonant frequencies in a transversal plane different from the higher mode resonant frequencies of longitudinal resonance.

8. The reactor according to claim 3, wherein the amplifying bar of each electroacoustic transducer has a front portion including the head, the front portion having a distribution of transverse holes extending in transverse planes with respect to the tube.

9. The reactor according to claim 3, wherein the amplifying bar of each electroacoustic transducer comprises a distribution of transverse slots extending in planes perpendicular to the longitudinal central axis of the tube.

10. The reactor according to claim 1, wherein the head of each electroacoustic transducer exhibits a concave surface substantially fitting the outer wall of the tube.

11. The reactor according to claim 1, wherein the head of each electroacoustic transducer exhibits a widening facing the tube.

12. The reactor according to claim 3, wherein the electroacoustic motor of each electroacoustic transducer comprises a piezoelectric resonator secured to the amplifying bar at the base of the electroacoustic transducer.

13. The reactor according to claim 12, wherein the piezoelectric resonator of each electroacoustic motor comprises two rows of piezoelectric elements between which a central electrode extends, the two rows and the central electrode being inserted between two lateral electrodes electrically interconnected together.

14. The reactor according to claim 13, wherein the central electrode has a shape of a metallic sheet, and the lateral electrodes are in a shape of metallic bars.

15. The reactor according to claim 13, wherein the amplifying bar of each electroacoustic transducer is made of a material having an acoustic impedance lower than an acoustic impedance of the lateral electrodes and the piezoelectric elements, and higher than an acoustic impedance of the material in which the tube is made.

16. The reactor according to claim 13, wherein the amplifying bar of each electroacoustic transducer comprises front and rear portions, the front portion including the head, the rear portion including the base, the portions being made of materials having acoustic impedances lower than an acoustic impedance of the lateral electrodes and the piezoelectric elements, the acoustic impedance of the front portion being lower than the acoustic impedance of the rear portion and higher than an acoustic impedance of the material in which the tube is made.

17. The reactor according to claim 13, wherein the electrodes are metallic, and the piezoelectric elements comprise ferroelectric ceramics.

18. The reactor according to claim 3, wherein the electroacoustic motor of each electroacoustic transducer comprises a magnetostrictive resonator secured to the amplifying bar at the base of the electroacoustic transducer.

19. The reactor according to claim 18, wherein the magnetostrictive resonator of each electroacoustic motor comprises a magnetic circuit including magnetostrictive elements around which an energizing coil is wound.

20. The reactor according to claim 19, wherein the magnetostrictive elements comprise magnetostrictive ceramics, and the magnetic circuit of each magnetostrictive resonator comprises ferromagnetic ceramic bars between which the magnetostrictive ceramics are inserted.

21. The reactor according to claim 19, wherein the magnetic circuit of each magnetostrictive resonator comprises a longitudinal stack of plates made of a ferromagnetic and magnetostrictive steel alloy.

22. The reactor according to claim 1, comprising a supporting polygonal structure having sides to which the bases of the electroacoustic transducers are secured, so that the electroacoustic transducers exhibit a concentric configuration around the tube.

23. The reactor according to claim 22, wherein the polygonal structure comprises two rings extending respectively above and below the electroacoustic transducers.

24. The reactor according to claim 23, wherein the rings are centered around the tube by braces mounted around the tube.

25. The reactor according to claim 23, wherein:
the tube has a longitudinal central axis, the prismatic bar shape being symmetrical with a plane of symmetry crossing the longitudinal central axis of the tube, each electroacoustic transducer extending parallel to the longitudinal central axis of the tube;
each electroacoustic transducer comprises a vibration amplifying bar having a shape of a prism of symmetrical section, a longitudinal axis parallel to the longitudinal central axis of the tube, a plane of symmetry which coincides with a plane of symmetry of the electroacoustic transducer, a narrow and elongated portion forming the head of the electroacoustic transducer, and an opposite and larger portion adjoined to the electroacoustic motor; and
the electroacoustic motor of each electroacoustic transducer comprises a resonator in a shape of a bar secured to the amplifying bar at the base of the electroacoustic transducer, the resonator comprising motor elements inserted between two bars having ends between which spacers are inserted, the ends of the bars being thinned down compared to a general thickness of the bars and respectively secured to sides of the rings.

26. The reactor according to claim 3, wherein each electroacoustic transducer comprises a number of elastic incurved retaining plates secured to the vibration amplifying bar and bearing on a central portion of a rear surface of the electroacoustic motor.

27. The reactor according to claim 3, wherein:
the electroacoustic motor of each electroacoustic transducer comprises a resonator including electromotor elements inserted between two metallic bars secured to the amplifying bar; and
each electroacoustic transducer comprises layers of glue between the bars, the electromotor elements and the amplifying bar.

28. The reactor according to claim 3, wherein:
the electroacoustic motor of each electroacoustic transducer comprises a resonator including electromotor elements inserted between two metallic bars secured to the amplifying bar; and
each electroacoustic transducer comprises layers of a grease substance between the bars, the electromotor elements and the amplifying bar.

29. The reactor according to claim 1, wherein the inner wall of the tube has a diameter at least equal to a wavelength of a sound in a liquid flowing in the tube at an operation frequency of the reactor.

30. The reactor according to claim 1, wherein the material of the tube is non-resonant.

31. The reactor according to claim 1, wherein the material of the tube is polymeric.

32. The reactor according to claim 1, wherein the lubricant is oil or an hydrocarbon.

33. The reactor according to claim 1, comprising an enclosure delimiting an inner space from an outer space, and in which the tube, the acoustic transducers and the films of lubricant are disposed, the inlet and outlet openings of the ends of the tube communicating with the outer space.

34. The reactor according to claim 33, wherein the tube extends in central axis of the enclosure.

35. The reactor according to claim 33, wherein the enclosure is surrounded by a peripheral radiator giving over the outer space.

36. The reactor according to claim 35, wherein the radiator comprises fins distributed around the enclosure and projecting in the outer space.

37. The reactor according to claim 33, wherein the enclosure is sealed and partially filled with a liquid in circulation from which the films of lubricant are made of, the liquid being adapted to cool down the electroacoustic transducers in the tube when the reactor is in operation.

38. The reactor according to claim 37, wherein the enclosure comprises inlet and outlet openings for the liquid between the outer space and the inner space.

39. The reactor according to claim 38, wherein the enclosure comprises a set of peripheral distribution conduits in the inner space connected to the inlet opening, and nozzles connected to the conduits and projecting between the electroacoustic transducers toward the tube, the nozzles having outlet openings for the liquid.

40. The reactor according to claim 39, wherein the enclosure is surrounded by a heat exchanger communicating with the peripheral distribution conduits.

41. The reactor according to claim 40, wherein the heat exchanger comprises an inner compartment adjacent to the enclosure, and an outer compartment adjacent to the inner compartment, the outer compartment being connected to the peripheral distribution conduits.

42. The reactor according to claim 37, wherein the enclosure comprises an opening between the outer space and the inner space, connectable to an external device for adjustment of a pressure in the enclosure.

43. The reactor according to claim 33, wherein the enclosure comprises a sealed connector block between the outer space and the inner space, the connector block having conductors electrically connected to the electroacoustic motors.

44. The reactor according to claim 33, wherein the enclosure comprises a cylindrical lateral wall and upper and lower covers secured to the lateral wall over and under the lateral wall, the covers having centers comprising coaxial braces receiving respectively the ends of the tube.

45. The reactor according to claim 44, wherein the enclosure comprises gaskets inserted between the covers and the lateral wall.

* * * * *